United States Patent [19]
Massara

[11] Patent Number: 5,772,281
[45] Date of Patent: Jun. 30, 1998

[54] DUAL SPRING BACK SUSPENSION SYSTEM FOR AN AUTOMOTIVE SEAT

[75] Inventor: Andrew J. Massara, Vargön, Sweden

[73] Assignee: Lear Corporation, Southfield, Mich.

[21] Appl. No.: 858,256

[22] Filed: May 19, 1997

[51] Int. Cl.$^6$ .................................................. A47C 3/025
[52] U.S. Cl. .................................. 297/284.4; 297/284.6; 297/410; 297/452.49
[58] Field of Search .............................. 297/408, DIG. 3, 297/391, 301.2, 301.1, 285, 284.6, 284.4, 284.1, 452.41, 452.34, 452.35, 452.36, 452.65, 404, 452.49

[56] References Cited

U.S. PATENT DOCUMENTS

| | | | |
|---|---|---|---|
| 4,123,105 | 10/1978 | Frey et al. | 297/452.65 X |
| 4,720,146 | 1/1988 | Mawbey et al. | 297/284.6 X |
| 5,076,643 | 12/1991 | Colasanti et al. | 297/284.6 |
| 5,082,326 | 1/1992 | Sekido et al. | 297/284.6 |
| 5,137,329 | 8/1992 | Neale | 297/284.6 |
| 5,190,348 | 3/1993 | Colasanti | 297/284.6 |
| 5,280,997 | 1/1994 | Andres et al. | 297/284.6 X |
| 5,316,375 | 5/1994 | Breen | 297/452.34 |
| 5,558,398 | 9/1996 | Santos | 297/284.6 X |
| 5,562,324 | 10/1996 | Massara et al. | 297/284.6 |

*Primary Examiner*—Milton Nelson, Jr.
*Attorney, Agent, or Firm*—Brooks & Kushman P.C.

[57] ABSTRACT

A vehicle seat assembly for an automotive vehicle including a rigid shell seat back, an S-curve plate located between the shell and the back of a seat occupant, the plate having a profile that corresponds to the thoracic region, the mid-spine region and the lumbar region of a seat occupant. A carrier member is situated between the plate and the shell, the plate being hinged on the carrier near the pelvis region of the seat occupant and the carrier being hinged at its lower margin for pivotal motion. A spring suspension for the carrier provides a cushion for forces transmitted to the seat back assembly by a seat occupant, the plate being suspended relative to the carrier by pneumatic springs or bladders at the upper and lower regions of the plate near the thoracic region and the lumbar region, respectively.

9 Claims, 5 Drawing Sheets

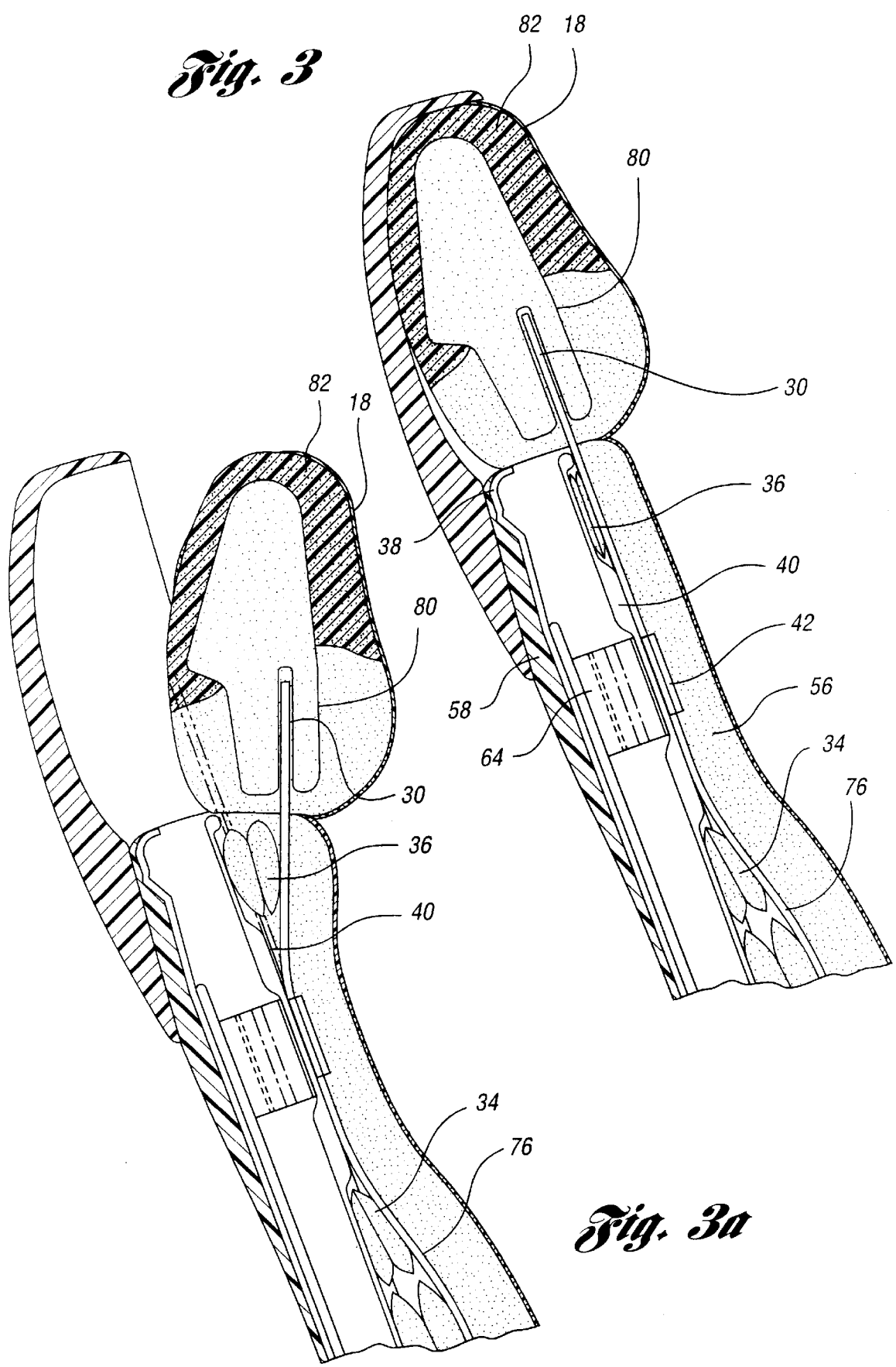

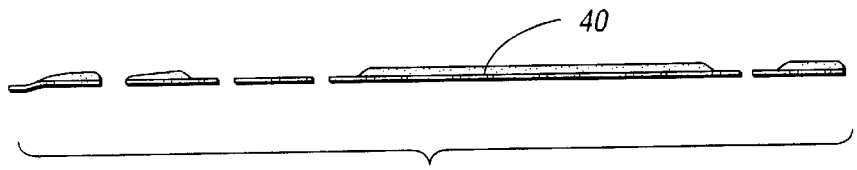
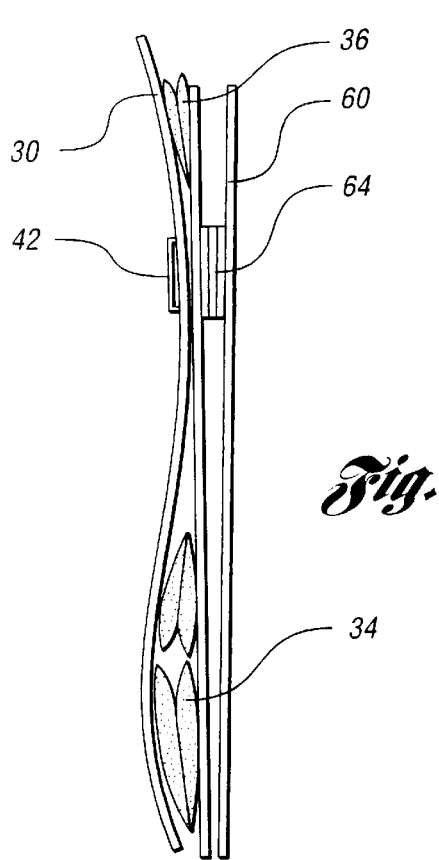
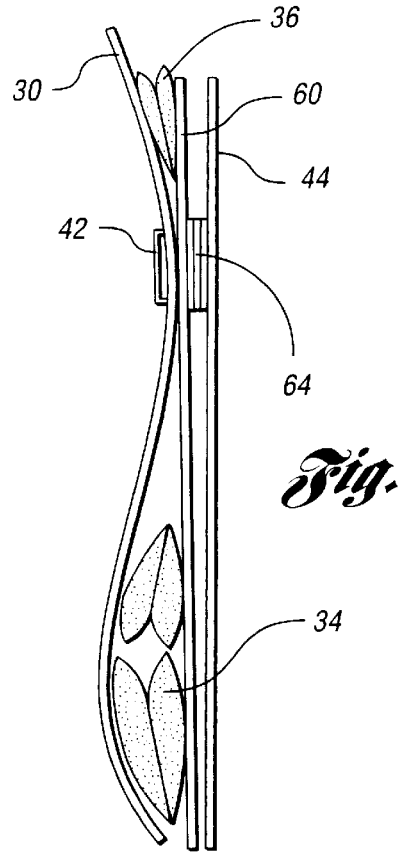
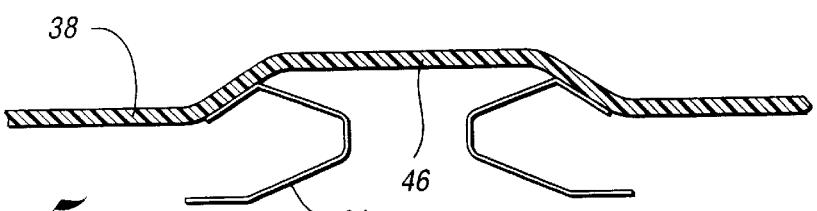
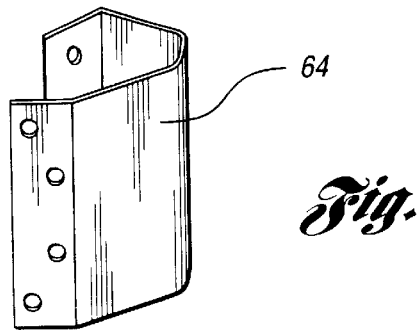

5,772,281

DUAL SPRING BACK SUSPENSION SYSTEM FOR AN AUTOMOTIVE SEAT

TECHNICAL FIELD

The invention relates to an automotive seat assembly for automotive vehicles including floating structural portions of a seat back.

BACKGROUND OF THE INVENTION

A typical automotive seat assembly for the passenger compartment of an automotive vehicle usually includes a structural frame that supports an upholstered and cushioned portion of a vehicle seat back assembly. Such structural frames for seat back assemblies often include a wire and spring sub-assembly, commonly referred to as a Flexolator, in order to provide a cushion for forces transmitted to the seat back by the seat occupant. Fabrics and seat padding or foam are used as a suspension for the rigid portions of the seat back cushion.

A seat back assembly that includes a frame comprised of a structural shell is disclosed in copending patent application Ser. No.08/787,680, filed Jan. 23,1997, entitled "Seat Assembly Incorporating Shell Structure", which is assigned to the assignee of my present invention.

Conventional seat back systems require extensive use of structural form for cushioning the vehicle occupant. They require further a rather complex assembly procedure. This complexity in the assembly process is due to the high part count, especially if a wire and spring Flexolator sub-assembly is used. The assembly procedure itself, even aside from the variable part costs, is often unacceptably costly in a high volume automotive seat manufacturing operation.

BRIEF DESCRIPTION OF THE INVENTION

The improved seat back assembly of my invention simplifies the assembly procedure for automotive seat assemblies and reduces the part count substantially. This makes it possible to use a rigid structural member comprising a hard shell seat back design, such as the one described in the co-pending patent application identified above. Other automotive seat designs having other types of rigid structural members for supporting cushion material also may incorporate the improvements of my invention.

A preferred embodiment of my improved design includes a rigid structural shell that may be formed in a simple stamping operation to provide a seat back and a cushion support. A plate, which may be used to support a head restraint at the upper margin of the seat back assembly, is hinged at its lower margin to the lower margin of a carrier for pneumatic or fluid springs or bladders at the thoracic region of the seat assembly as well as at the lumbar region. A bracket structure connects the plate to the carrier at a location intermediate the locations of the bladders. Mechanical springs are disposed between the structural shell and the carrier so that the plate and the carrier sub-assembly may float on the structural shell, thereby providing a high degree of compliance as the vehicle occupant exerts forces on the seat back assembly at various parts of the anatomy of the occupant. The compliance required for the lumbar region of the seat assembly can be tailored with respect to the degree of compliance at other portions of the seat assembly (e.g., the thoracic region), thereby accommodating the restraint requirements of the different parts of the anatomy of the occupant.

The plate is hinged on the carrier and the carrier, in turn, is hinged on the structural shell. The location of each hinge is generally in the area of the pelvis of the seat occupant.

BRIEF DESCRIPTION OF THE DRAWINGS

FIG. 2b is a cross-sectional view of the carrier taken along section line 2b—2b of FIG. 2;

FIG. 3 is a cross-sectional view of the upper portion of the seat assembly illustrated in FIG. 1, wherein portions of the seat assembly are shown in cross-section in a fore-and-aft plane containing the central axis of the seat assembly;

FIG. 3a a side elevation view of the seat back assembly showing the head restraint portion of the seat assembly adjusted forward;

FIG. 4 is a schematic illustration of a subassembly of the seat of FIG. 1 showing the so-called S-plate and the carrier in cross-section;

FIG. 4a is a view similar to FIG. 4, but it shows the plate displaced toward the shell;

FIG. 5 is a cross-sectional view of the structural shell taken on a horizontal plane located midway between the upper and lower margins of the seat back assembly; and FIG 5a is a detail isometric view of a spring that forms a part of the spring assembly for suspending the carrier and plate sub-assembly on the rigid structural shell.

PARTICULAR DESCRIPTION OF THE INVENTION

Figure 1:
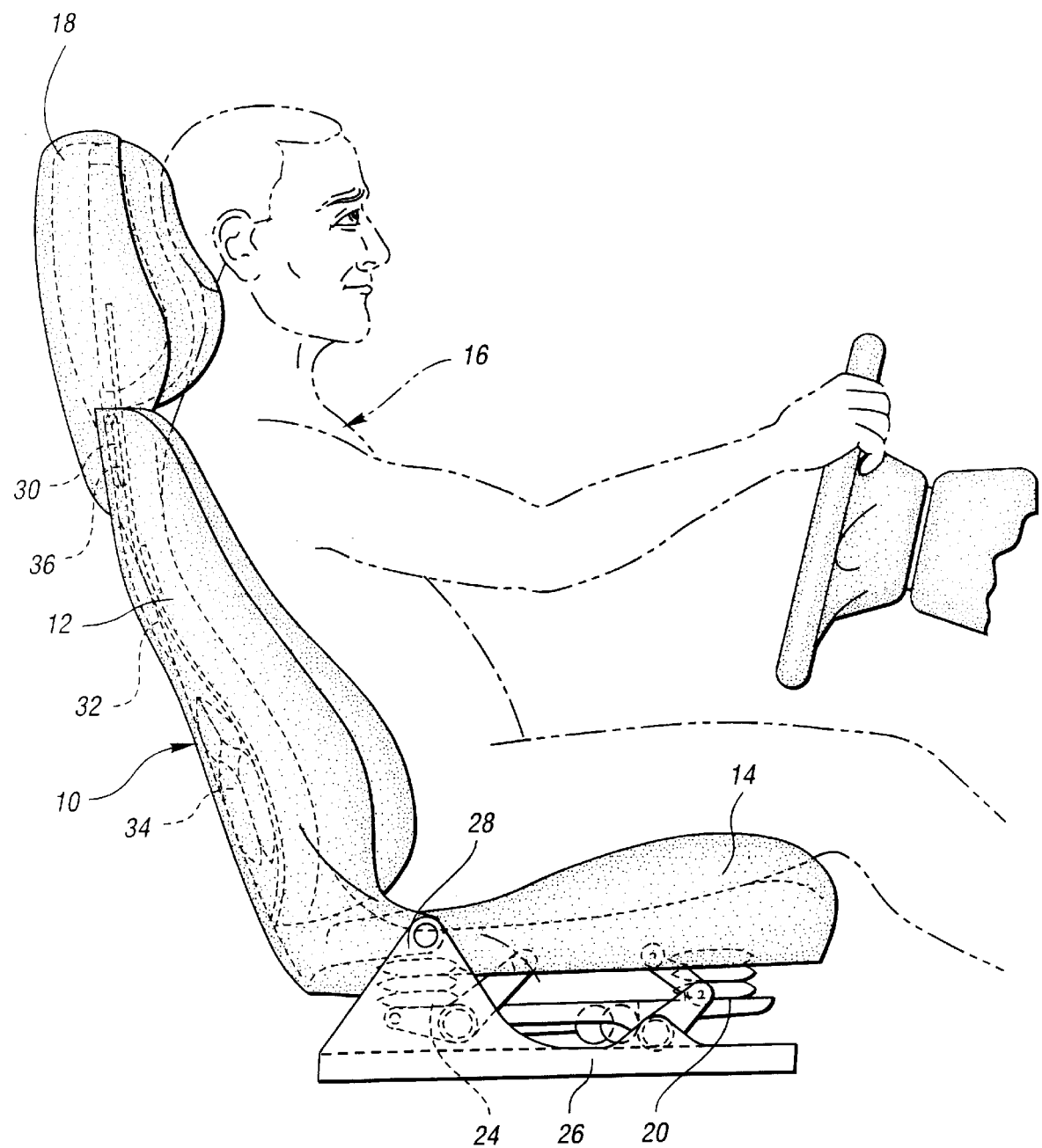
FIG. 1 is a schematic view shown in side elevation of a vehicle seat assembly together with a seat occupant in the form of a dummy.

In FIG. 1, an automotive seat assembly 10 includes a cushioned seat back portion 12 and a cushioned seat portion 14. A vehicle occupant, represented by dummy 16, is supported on the seat portion 14 and the seat back assembly 12 so that the occupant is positioned for comfort and for maintenance of the most desirable posture for controlling the vehicle. A head restraint 18 is supported on the upper margin of the seat back assembly 12.

Although I have shown in FIG. 1 a front driver seat assembly, it should be understood that the teachings of my disclosure may be applied as well in the design of front passenger seats and rear passenger seats.

The seat portion 14 is supported on a seat track assembly which includes a mounting plate 20. Pneumatic fluid or mechanical springs 22 and 24 support the seat portion 14 on the mounting plate 20. The seat track includes seat supporting rails 26 and a structural bracket 28 on which the seat back assembly can be pivotally mounted. A suitable seat adjusting linkage permitting forward fore-and-aft movement of the seat portion 14 and tilting motion of the seat back 12 relative to the seat portion 14 may be used, but such structure does not form a part of my invention. Any number of conventional seat adjusting linkages may be used.

The S-plate or back support plate and the carrier for the bladder suspension are shown in phantom in FIG. 1. They are identified by reference numerals 30 and 32, respectively. The bladder assembly near the lumbar region of the seat assembly is shown in phantom lines at 34. The bladder at the thoracic region of the seat assembly is shown in phantom at 36. These features will be described subsequently.

Figure 2:
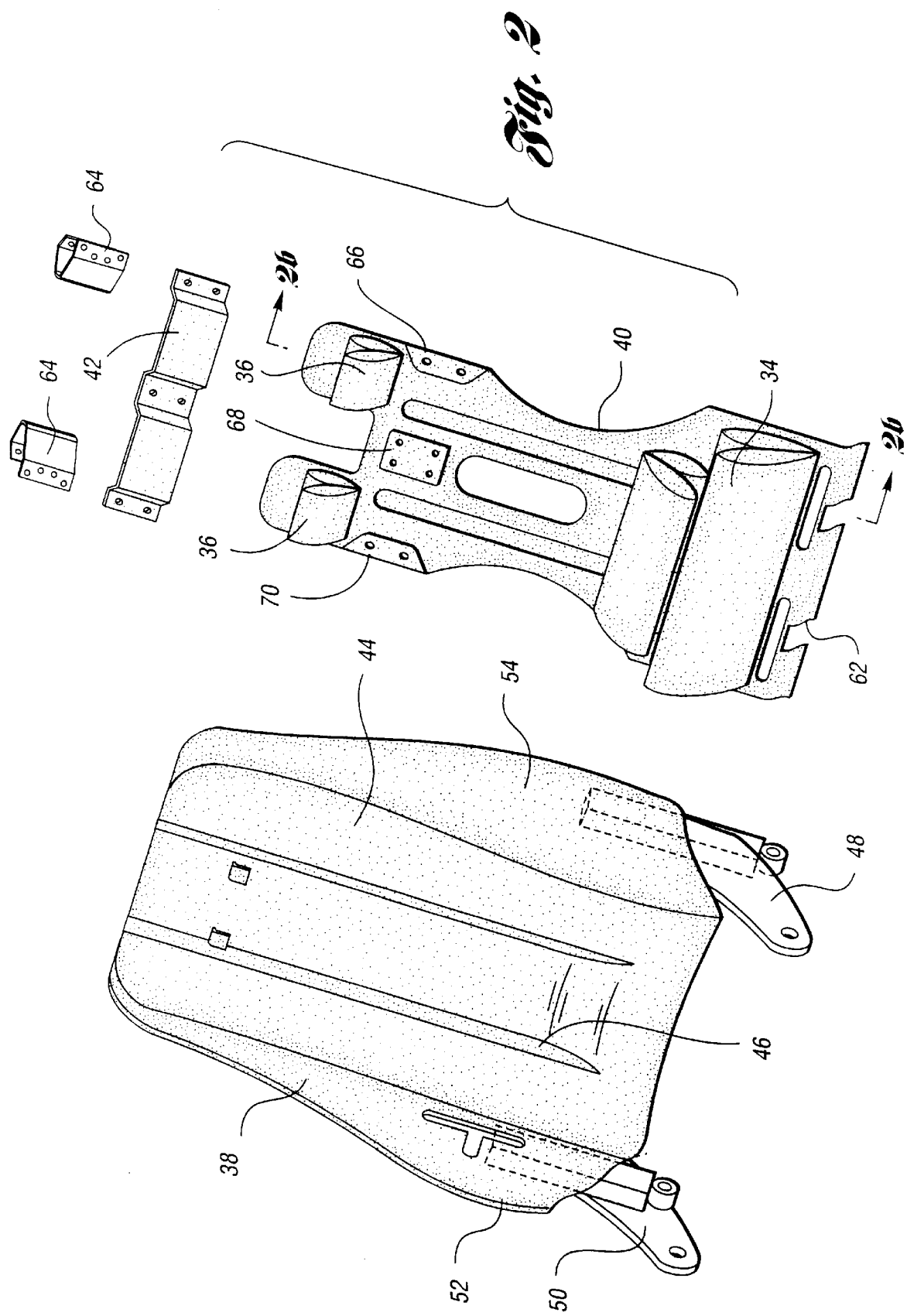
FIG. 2 is a composite exploded isometric assembly view of portions of the seat assembly including the structural shell, the carrier and bracket structure.

FIG. 2 illustrates the structural shell and the carrier, as well as the S-curve plate supporting bracket. The shell is shown at 38, the carrier is shown at 32, and an S-curve plate supporting bracket is shown at 42. The shell 38 includes a main body portion 44, a trench or tunnel 46 extending vertically along its central geometric axis. Shell supporting brackets 48 and 50 are pinned or otherwise pivotally mounted on the seat track bracket 28 described with reference to FIG. 1.

Figure 2A:
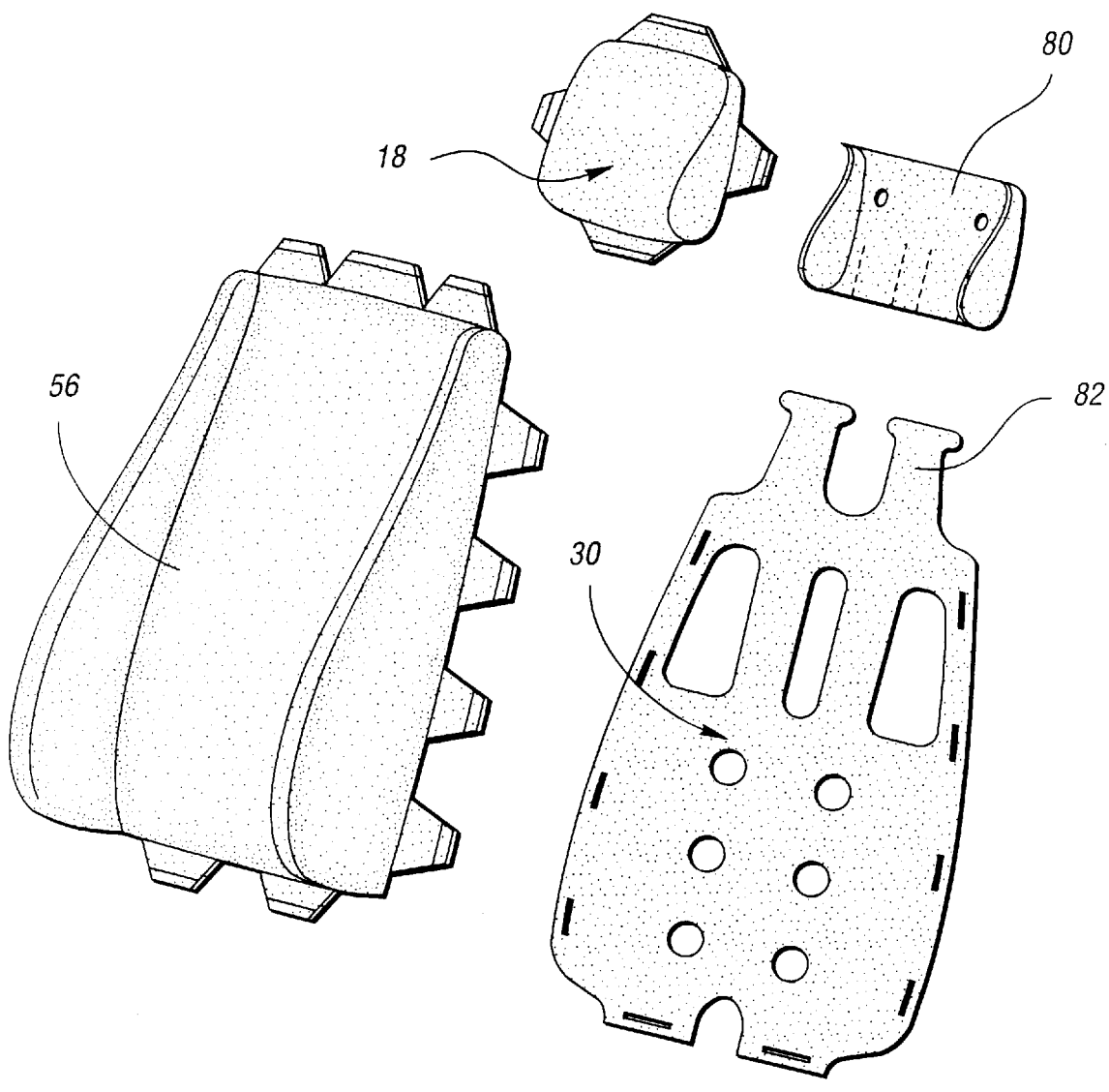
FIG. 2a is a composite exploded isometric assembly view of a seat cushion and a back support plate.

The shell 38 includes wing portions 52 and 54 which receive a cushion, generally indicated at 56 in FIG. 2a.

As seen in FIGS. 2, 3 and 3a, the structural shell envelops the carrier and the S-plate. It includes skinned foam 58 on the backside of the seat assembly. The carrier 32 extends in generally parallel disposition with respect to the shell 38. It is hinged at its lower margin 62, as shown in FIG. 2, to the shell 38 so that it may pivot about its hinged restraint relative to the shell.

A pair of suspension springs, shown at 64, is interposed between the carrier 32 and the shell 38. This is best seen in FIGS. 4, 4a and 5. FIGS. 2 and 5a show isometric detail views of the suspension springs 64.

FIG. 3 shows also the position of the bracket 42, which is used to secure the carrier to the S-plate. Thus the carrier and the S-plate, both of which are supported at their lower margins on the shell 38 near the pelvic region, will float as a sub-assembly relative to the rigid structural shell 38. The seat cushion shown generally in FIG. 2a at 56 is seen also in FIG. 3.

The bracket 42 is secured to the carrier 32 at locations 66, 68 and 70, as seen in FIG. 2. Those locations are intermediate the upper and lower margins of the carrier, but they are closer to the upper margin near thoracic cushions or bladder assembly 36. A larger lumbar cushion or bladder assembly is shown at 34 in FIG. 2 at the lumbar region near the hinged connection between the carrier 32 and the shell 38.

As seen in FIG. 3a, the bladder assembly 34, when it is inflated, will displace the S-curve plate from the carrier, thereby providing a smooth lumbar support curve, as indicated at 76. Similarly, the upper region of the S-curve plate is flexed away from the carrier by the cushion or bladder assembly 36. Thus, the plate is suspended for floating movement relative to the carrier and the carrier is suspended for floating movement by the spring assembly 64 relative to the shell 38.

FIG. 4 shows in schematic form the relationship between the carrier 32 and the S-curve plate 30. The bracket 42 secures the plate 30 to the carrier 32 at a location intermediate the bladder assemblies 34 and 36, but the location of the bracket is closer to the bladder assembly 36 than it is to bladder assembly 34.

FIG. 4a shows the position of the plate relative to the carrier when the spring 64 is compressed and the bladder assemblies are pressurized. The sub-assembly that comprises the carrier and the S-plate thus are supported on the stationary shell and achieve a floating suspension effect as the plate adjusts relative to the carrier to provide a compliant restraint for the seat occupant.

FIG. 5a shows an enlarged view of a portion of the spring suspension 64. As seen in FIG. 5a, the spring suspension comprises leaf spring members that are generally planar and are C-shaped. It should be understood, however, that the particular spring design illustrated in FIG. 5a is only one of several possible spring-types that might be used as a suspension for the carrier on the stationary shell. For example, coil springs could be used instead of the leaf springs illustrated here.

The springs, as seen in FIG. 5, preferably are located in the tunnel 46 of the stationary shell 38. The tunnel 46 is best seen, as mentioned earlier, in FIG. 2. One margin of the leaf spring members 64 can be secured to one side of the tunnel 46 and the companion spring member 64 can be secured to the opposite side of the tunnel 46.

The head restraint 18 generally is described earlier with reference to FIG. 1. It is shown also in FIG. 3 and 3a. It includes a rigid core member 80 situated within a padded and upholstered region 81. It has a retainer slot that receives the upper margin 82 of the S-curve plate 30 and is held fast on the S-curve plate in this fashion. FIG. 2a also shows the upper margin 82 of the plate 30, which enters the core member 80 to provide support for the head restraint.

FIG. 3a shows the head restraint when it is adjusted forwardly as the thoracic adjustment bladder assembly 36 is pressurized. The plate 30 yields between the point of attachment by the bracket 42 and its upper margin. This may occur independently or simultaneously with respect to adjustment of the lumbar portion of the plate 30 by the bladder assembly 34. Each of the bladder assemblies 34 and 36 can be controlled in known fashion by either a manual or a mechanical hydraulic fluid pumping mechanism.

Having described a preferred embodiment of my invention, what I claim and desire to secure by U.S. Letters Patent is:

1. A seat assembly for a passenger compartment of an automotive vehicle comprising an upright seat back portion, a seat portion, and a seat support structure for said seat portion;

said seat back portion having a rigid frame connected at its lower margin thereof to said support structure;

a cushion carrier member forming a part of said upright seat back portion;

a back support plate disposed adjacent said carrier member and connected to said carrier member at a location intermediate the upper and lower margins thereof;

said carrier member being pivotally connected to said rigid frame at one margin thereof;

a suspension spring means between said carrier member and said rigid frame at a location intermediate said upper and lower margins;

at least one cushion disposed between said carrier member and said back support plate, whereby said carrier member and said back support plate define a floating suspension for a seat occupant with respect to said rigid frame.

2. The seat assembly as set forth in claim 1 wherein said carrier member is hinged at its lower margin to said rigid frame and said back support plate is pivoted at its lower margin to said carrier member.

3. The seat assembly as set forth in claim 2 wherein said cushions are inflatable bladders adapted to receive a fluid, whereby adjustment of said back support plate relative to said carrier member may be accomplished while providing a cushioned support for a seat occupant.

4. The seat assembly as set forth in claim 1 including an upper thoracic region and a lower lumbar region, wherein a first cushion is disposed between said carrier member and said back support plate above the connection therebetween and near said thoracic region, a second cushion disposed between said carrier member and said back support plate below the connection therebetween and near said lumbar region.

5. The seat assembly as set forth in claim 4 wherein said carrier member is hinged at its lower margin to said rigid frame and said back support plate is pivoted at its lower margin to said carrier member.

6. The seat assembly as set forth in claim 4 wherein said cushions are inflatable bladders adapted to receive a fluid, whereby adjustment of said back support plate relative to said carrier member may be accomplished while providing a cushioned support for a seat occupant.

7. The seat assembly as set forth in claim 6 including a head restraint secured to the upper margin of said back support plate, said head restraint being moved in a forward direction relative to said carrier member when said first bladder is pressurized.

8. The seat assembly as set forth in claim 6 wherein said rigid frame is a structural shell, said shell being located rearward of said carrier member, said back support plate being disposed forward of said carrier member, whereby said back support plate flexes in response to pressure forces by said bladders to establish an S-curve shaped contour for said seat back portion.

9. The seat assembly as set forth in claim 8 including a head restraint secured to the upper margin of said back support plate, said head restraint being moved in a forward direction relative to said carrier member when said first bladder is pressurized.

* * * * *